United States Patent
Nakase et al.

(10) Patent No.: US 10,261,649 B2
(45) Date of Patent: Apr. 16, 2019

(54) TOUCH PANEL AND METHOD FOR FORMING WIRING AREA

(71) Applicant: SMK Corporation, Tokyo (JP)

(72) Inventors: Takayuki Nakase, Toyama (JP); Tsutomu Inoue, Toyama (JP)

(73) Assignee: SMK Corporation, Tokyo (JP)

( * ) Notice: Subject to any disclaimer, the term of this patent is extended or adjusted under 35 U.S.C. 154(b) by 2 days.

(21) Appl. No.: 15/823,592

(22) Filed: Nov. 28, 2017

(65) Prior Publication Data
US 2018/0284931 A1   Oct. 4, 2018

(30) Foreign Application Priority Data
Mar. 31, 2017 (JP) ................. 2017-069490

(51) Int. Cl.
*G06F 3/041* (2006.01)
*G06F 3/044* (2006.01)
*G06F 3/047* (2006.01)

(52) U.S. Cl.
CPC ............ *G06F 3/047* (2013.01); *G06F 3/044* (2013.01); *G06F 3/0412* (2013.01); *G06F 2203/04112* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,451,698 | A  * | 5/1984 | Whetstone | G06F 3/046 178/18.07 |
| 2015/0277628 | A1 | 10/2015 | Leong et al. | |
| 2015/0378196 | A1 * | 12/2015 | Ochiai | G02F 1/1339 349/123 |
| 2016/0026328 | A1 * | 1/2016 | Chien | G06F 3/0416 345/173 |
| 2017/0147128 | A1 * | 5/2017 | Ishizaki | G06F 3/0412 |
| 2017/0357345 | A1 * | 12/2017 | Ikeda | G06F 3/0412 |
| 2018/0192503 | A1 * | 7/2018 | Fang | G06F 3/0488 |
| 2018/0217696 | A1 * | 8/2018 | Binstead | G06F 3/047 |
| 2018/0252955 | A1 * | 9/2018 | Kurasawa | G02F 1/13338 |

* cited by examiner

*Primary Examiner* — Priyank J Shah

(57) ABSTRACT

Possibility of erroneous operation caused by a conductive area as a tolerance margin is reduced and electrical properties are prevented from becoming poor.
A touch panel includes: a sensor part; and a wiring area including a wiring for connecting the sensor part and a connector part, in which a first and a second trimming lines are provided over a conductive area located inside and/or outside of several wirings in the wiring area, a first section including a wiring with a first width and a second section including a wiring with a second width crossing the conductive area in the width direction and wider than the first width are formed by the first trimming line, and the second trimming line crosses the first trimming line in the second section so that the width of the wiring in the second section is narrower than the second width

7 Claims, 8 Drawing Sheets

TOUCH PANEL AND METHOD FOR FORMING WIRING AREA

CROSS REFERENCE TO RELATED APPLICATION

The contents of the following Japanese patent application are incorporated herein by reference,
Japanese Patent Application No. 2017-69490 filed on Mar. 31, 2017.

FIELD

The present invention relates to a touch panel and a method for forming a wiring area.

BACKGROUND

Recently, a touch panel in which a touch sensor for detecting an operation input is provided on a display element of a liquid crystal display element and the like included in a mobile device, a mobile phone, a car navigation system, and the like (also referred to as touch screen or the like) has become popular, and a curved touch panel with a curved input area referred to as 2.5D or 3D shape has also been proposed. As a system of touch panel, electrostatic capacitance touch panel is known.

Such a touch panel includes a sensor part in which an X electrode pattern and a Y electrode pattern made of a transparent conductive film (ITO (Indium Tin Oxide)) are formed. A wiring area (metal wiring area) is formed around the sensor part and the sensor part is connected to a connector part via the wiring area. The touch panel is connected to an external device via the connector part. As a method for forming a wiring area, laser trimming can be used. For example, JP-A-2015-197926 discloses that a dummy pattern set is provided between detection electrodes by laser trimming. In addition, in laser trimming, a curved part is provided in the detection electrode in zigzag form.

SUMMARY

When wiring in the wiring area is formed by laser trimming, it is necessary to provide a tolerance margin. Tolerance margin refers to a difference between the maximum dimension and the minimum dimension of an error of a trimming position that is allowed when performing laser trimming. The tolerance margin is formed to be located outside the wiring area, for example, as a part of a conductive area made of a conductive material (for example, silver). Since the known tolerance margin is formed wider than other wirings by a conductive material in consideration of errors, the tolerance margin is capacity-coupled with nearby wiring or a sensor part. As a result, there has been a problem that electrical properties of electrostatic capacitance touch panel are affected and erroneous performance occurs when touched by a finger. While JP-A-2015-197926 discloses laser etching to the structure of the sensor part, it does not solve the above-mentioned problem with respect to wiring area.

Therefore, an object of the present invention is to provide a touch panel and a method for forming a wiring area that can solve such a problem.

An aspect of the present invention is a touch panel including: a sensor part; and a wiring area including a wiring for connecting the sensor part and a connector part, in which a first and a second trimming lines are provided over a conductive area located inside and/or outside of several wirings in the wiring area, a first section including a wiring with a first width and a second section including a wiring with a second width crossing the conductive area in the width direction and wider than the first width are formed by the first trimming line, and the second trimming line crosses the first trimming line in the second section so that the width of the wiring in the second section is narrower than the second width.

An aspect of the present invention is a method for forming a wiring of a touch panel that includes forming a sensor part and a wiring area included by a wiring for connecting the sensor part and a connector part, in which a first and a second trimming lines are provided over a conductive area located inside and/or outside of several wirings in the wiring area, a first section including a wiring with a first width and a second section including a wiring with a second width crossing the conductive area in the width direction and wider than the first width are formed by the first trimming line, and the width of the wiring in the second section is narrower by the second trimming line crossing the first trimming line in the second section.

According to an aspect of the present invention, since the conductive area is cut by the first trimming line, influence when the conductive area as the tolerance margin is capacity-coupled with other wirings or the like can be reduced. In addition, the wiring width is adjusted by the second trimming line, it is possible to prevent imbalance of different wiring resistance from other wirings, and it is possible to stabilize electrical properties. Note that, the present invention shall not be limited by effects exemplified in the present specification.

DESCRIPTION OF EMBODIMENTS

Figure 1A:
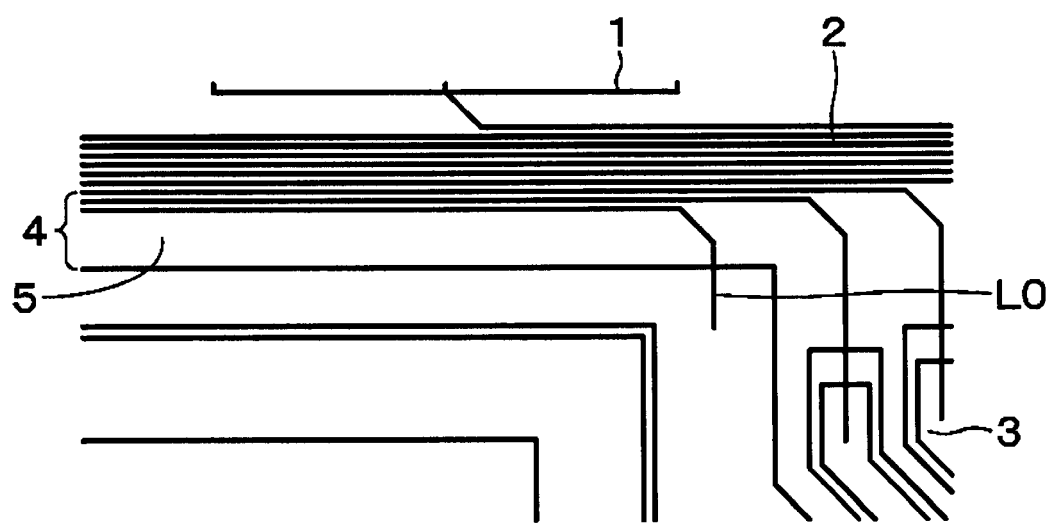
FIG. 1A is a schematic line figure illustrating a part of a wiring area of a touch panel according to one embodiment of the present invention.

Hereinafter, one embodiment of the present invention will be described with reference to the drawings. The description will be made in the following order.
<1. One Embodiment>
<2. Modifications>

Note that, embodiment and the like described below merely show examples of configuration for embodying technical concept of the present invention and the present invention is not limited to exemplified configurations. In addition, the components described in the claims are not limited to the components of an embodiment. Specifically, the descriptions of the dimension, the material, the shape, the relative position, and the directions of upper, lower, right, and left in the embodiment do not limit the scope of the present invention thereto unless otherwise noted, and are merely examples. Note that, the size, the positional relationship, and the like of the components illustrated in each figure are sometimes exaggerated in order to clarify the description, and only part of reference numerals is sometimes shown in a drawing in order to simplify the drawing. Moreover, in the following description, the same title and reference numeral denote the same or similar component and repetitive description is omitted as appropriate. Furthermore, with respect to each element included in the present invention, several elements can be made of the same component and one component serves as several elements, or in reverse, the function of one component can be realized by several components.

<1. One Embodiment>

Hereinafter, a touch panel according to one embodiment of the present invention will be described. A touch panel is used as an input device of various electronic devices such as mobile information terminal, mobile phone, and car navigation system. In addition, while one embodiment describes a so-called electrostatic capacitance touch panel, in which many electrodes are provided along an input operation area over an insulating substrate and which detects an electrode with varied electrostatic capacitance between detection electrodes when an input operation unit such as finger approaches and detects an input operation position from the position of that electrode, the present invention is not limited thereto.

A process for forming a wiring area of a touch panel by laser trimming will be described with reference to FIGS. 1 A to 1C. Note that, in FIGS. 1 A to 1C and the subsequent drawings, the reference numeral 1 denotes a sensor part of the touch panel and a wiring area 2 connected to the outermost sensor, for example, of the sensor part 1 is provided around the sensor part 1. An output signal of the sensor part 1 is transmitted to a connector part 3 via the wiring of the wiring area 2. For example, an electrode pattern of the wiring area 2 is formed by trimming the conductive film formed over the insulating material by laser. The line drawn in the wiring area 2 represents trimming line formed by laser.

As illustrated in FIG. 1A, when the wiring area 2 is formed by laser trimming, it is necessary to provide a tolerance margin 4 outside or inside the wiring area 2. The tolerance margin 4 is included in the area of the conductive material for forming wiring by laser trimming, and influences electrical properties of the electrostatic capacitance touch panel if not appropriately treated. For example, if laser trimming is performed by the trimming line L0, an area 5 of the conductive material with the width similar to the width of the tolerance margin 4 (hereinafter sometimes referred to as conductive area) is left, and the conductive area 5 is capacity-coupled with other nearby wirings and becomes a cause of erroneous operation when touched by a finger. Example of specific values is shown below.

Laser cut width: 0.03 mm
Wiring pattern width: 0.05 mm
Pitch: 0.08 mm
Tolerance margin: about 0.2 mm (more than twice of pitch)

Figure 1B:
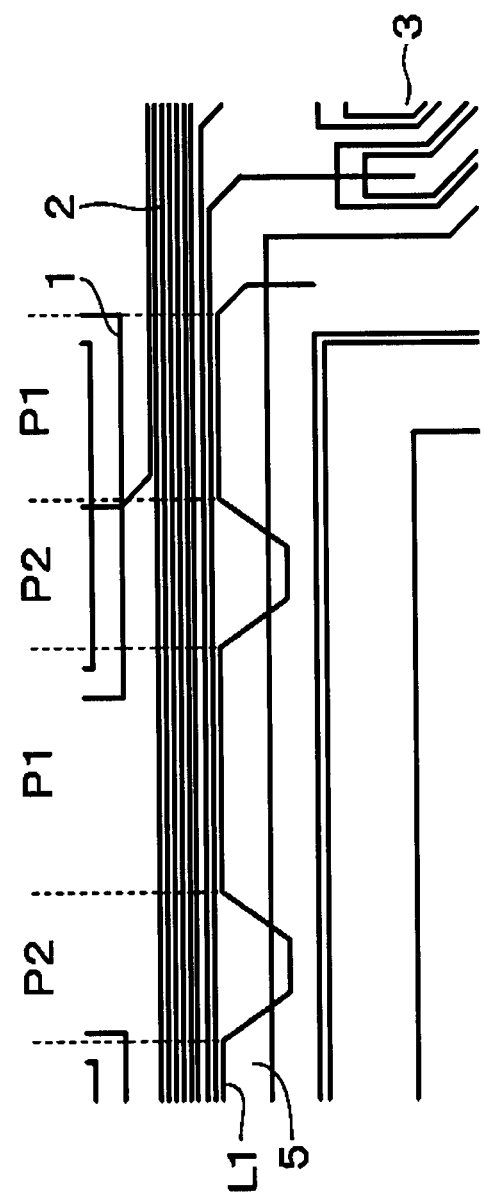
FIG. 1B is a schematic line figure illustrating a part of a wiring area of a touch panel according to one embodiment of the present invention.

Then, as illustrated in FIG. 1B, laser trimming is performed by the first trimming line L1. By the trimming line L1, a first section P1 including wiring with the first width and a second section P2 including wiring with the second width crossing the conductive area 5 in the width direction and wider than the first width are formed. As a result, the conductive area 5 can be cut into pieces (the conductive area 5 can be segmented), and the coupling capacitance between the conductive area 5 and other wirings can be smaller. While a part with narrow width of the wiring formed in such a manner (a part with width similar to other wirings) (first section P1) has wiring resistance similar to other wirings, a part with wide width of the wiring (second section P2) has lower resistance value of wiring and becomes imbalance with other wiring resistance. Therefore, it becomes difficult to stabilize electrical properties of the touch panel.

Figure 1C:
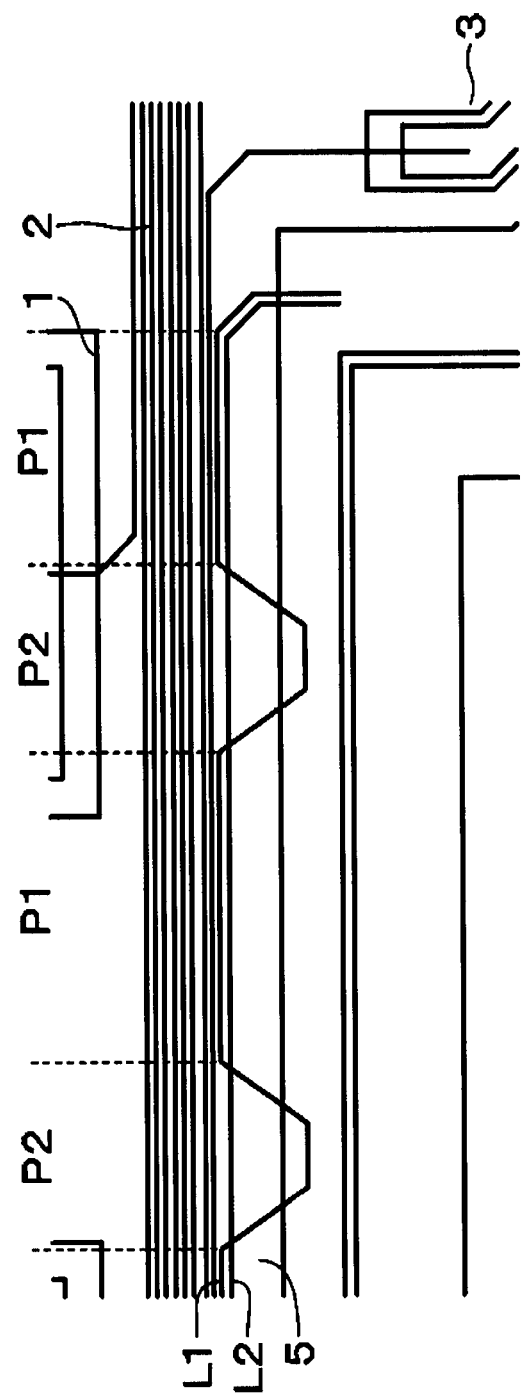
FIG. 1C is a schematic line figure illustrating a part of a wiring area of a touch panel according to one embodiment of the present invention.

In one embodiment of the present invention, as illustrated in FIG. 1C, the second trimming line L2 for adjusting wiring width is added. The trimming line L2 is drawn substantially parallel with, and near the trimming line L1 in the first section P1, and crosses the trimming line L1 in the second section P2. By this means, it is possible to reduce change of the width of the wiring and to prevent imbalance of wiring resistance.

<2. Modification>

[Modification 1]

Figure 2A:
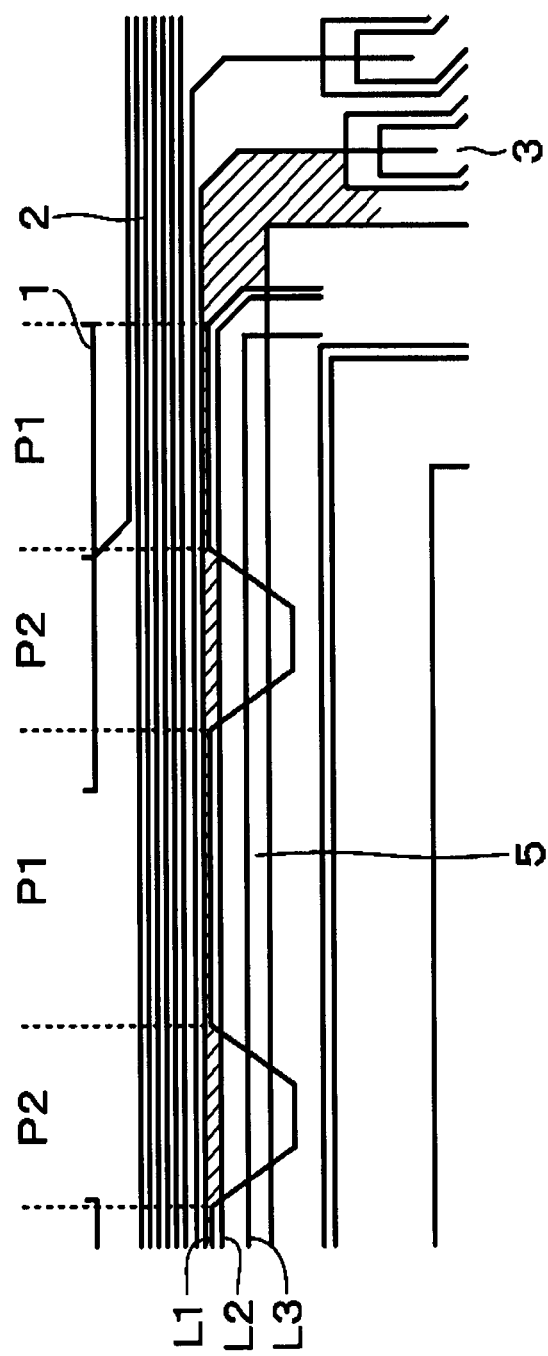
FIG. 2A is a schematic line figure illustrating a part of a modification of the wiring area of the touch panel according to one embodiment of the present invention.

While the conductive area can be segmented, the difference between the area of the conductive area 5 in the first section P1 and the area of the conductive area 5 in the second section P2 is large in the extending direction of wiring, and electrical properties are not stable. Then, as illustrated in FIG. 2A, laser trimming is performed by the third trimming line L3 for adjusting conductive area parallel with the trimming line L2. In this case, the position of the trimming line L3 is determined so that one of the conductive areas separated by the trimming line L3 and the other area becomes as equal as possible. By this means, the areas of the conductive areas become equal and it is possible to prevent variation in coupling capacitance in the extending direction of wiring. Note that, in FIG. 2A, a part where wiring is provided is hatched.

[Modification 2]

Figure 2B:
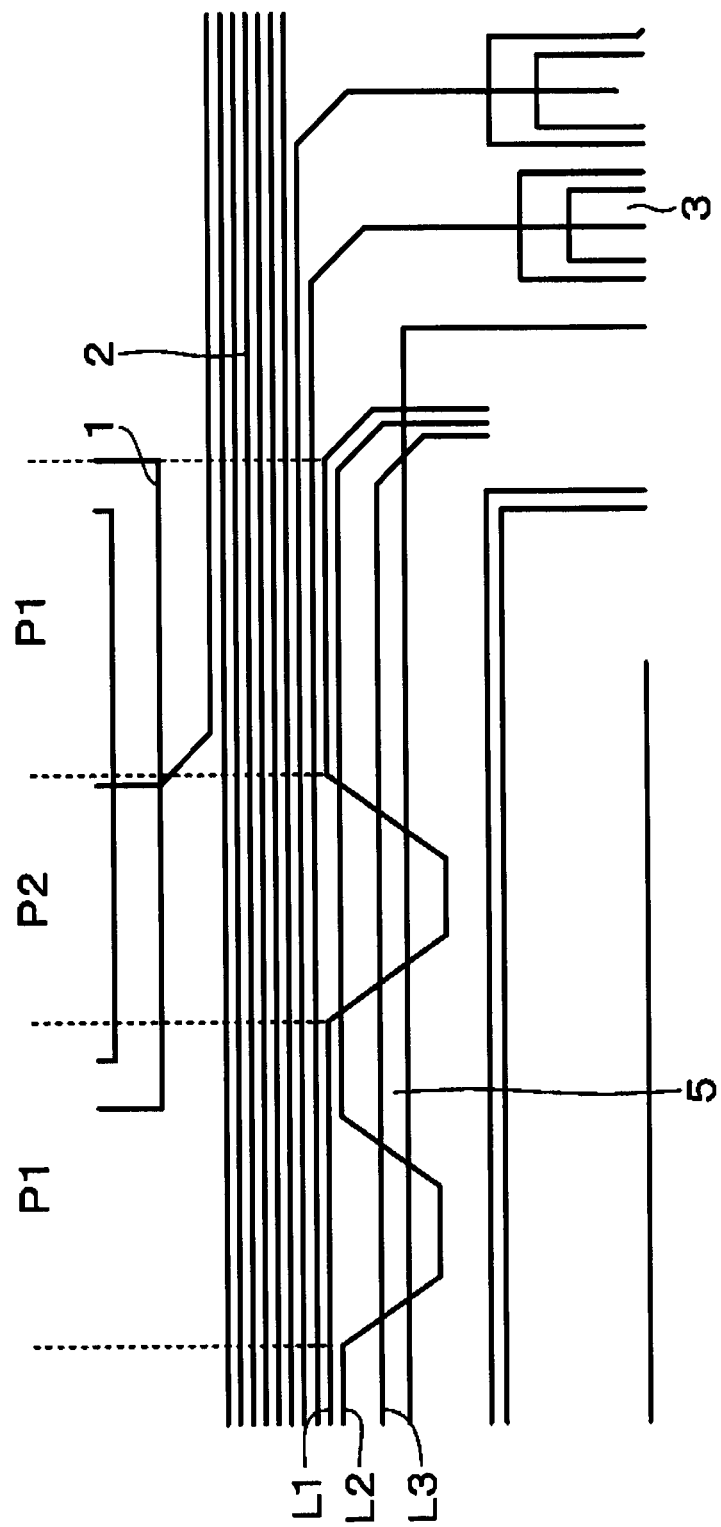
FIG. 2B is a schematic line figure illustrating a part of a modification of the wiring area of the touch panel according to one embodiment of the present invention.

As illustrated in FIG. 2B, in the first section P1 of the trimming line L1, the trimming line L2 for adjusting the wiring width crosses the conductive area 5. As a result, it is possible to make the area of the conductive area 5 smaller and make the coupling capacitance between the conductive area 5 and other wiring and the like smaller.

[Modification 3]

Figure 3:
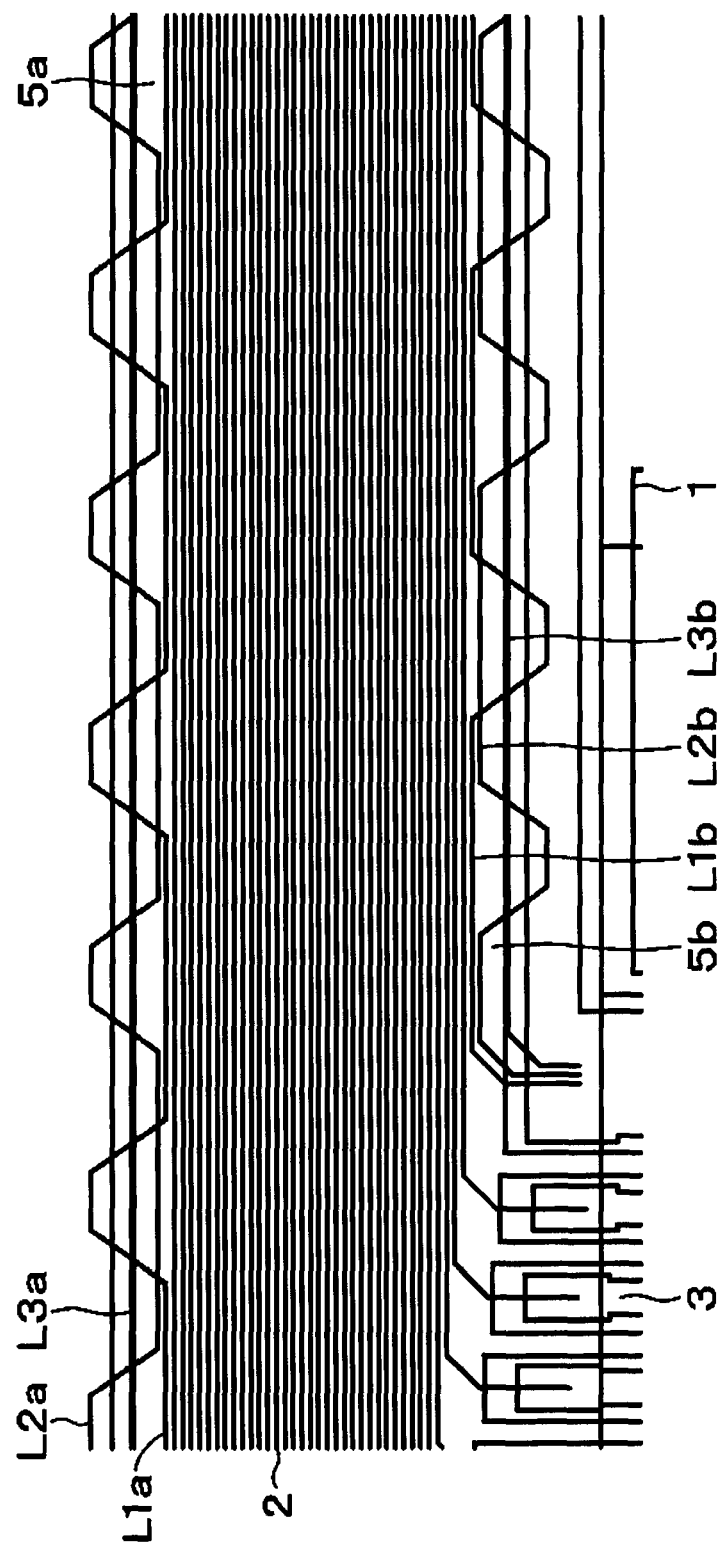
FIG. 3 is a schematic line figure illustrating a part of a modification of the wiring area of the touch panel according to one embodiment of the present invention.

As illustrated in FIG. 3, the present invention can also be applied on a case where there are conductive areas 5a. and 5b at the both sides of the wiring area 2 as the tolerance margin 4. The first trimming line L1a, the second trimming line L2a, and the third trimming line L3a are provided on the one conductive area 5a. The first trimming line L1b, the second trimming line L2b, and the third trimming line L3b are provided on the other conductive area 5b. By the first trimming lines L1a and L1b, the first section including wiring with the first width and the second section crossing the conductive areas 5a and 5b in the width direction and including wiring with the second width wider than the first width are formed.

The second trimming lines L2a and L2b cross the first trimming lines L1a and L1b respectively in the second section so as to make the width of the wiring of the second section narrower than the second width. The third trimming lines L3a and L3b cross the conductive areas 5a and 5b respectively so that the conductive area is adjusted.

[Modification 4]

The order of forming the trimming line may be changed as appropriate. For example, the trimming line L1 may be formed after the trimming line L2 is formed.

While one embodiment of the present invention has been described above, the present invention is not limited to one embodiment described above and various modifications are possible. For example, the present invention can be applied to a touch panel of a type other than electrostatic capacitance type touch panel. Moreover, the present invention can be applied to a method for forming wiring to provide a conductive area as a tolerance margin other than laser trimming. In addition, the structure, the method, the process, the shape, the material, the numerical value, and the like described in the above embodiment and modifications are merely examples, and different structures, methods, processes, shapes, materials, numerical values, and the like may be used as appropriate or these may be substituted by known ones. Moreover, the structure, the method, the process, the shape, the material, the numerical value, and the like in the above embodiment and modifications can be combined with one another in so far as technical inconsistency does not occur.

EXAMPLE

Figure 4:
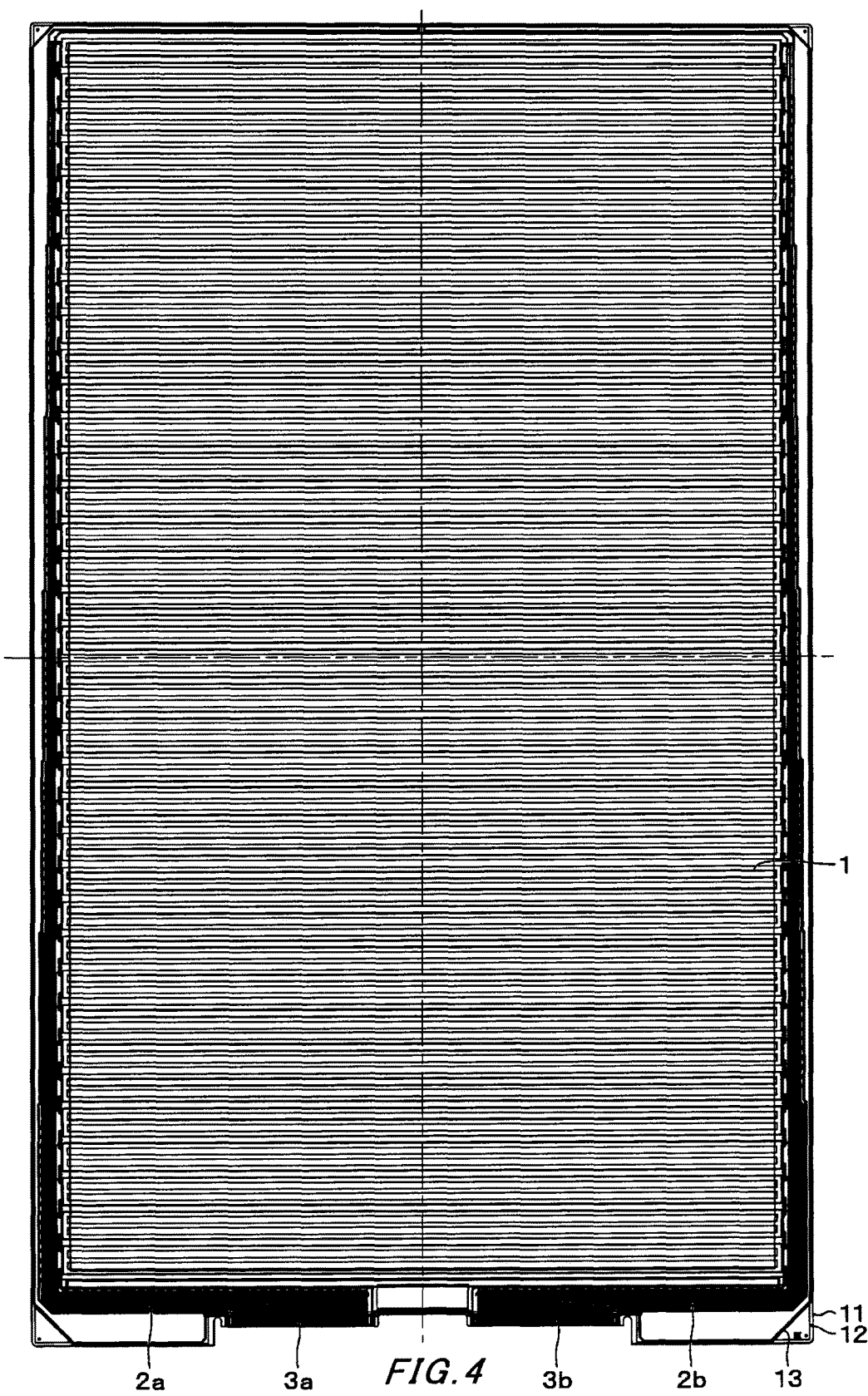
FIG. 4 is a plan view illustrating the touch panel according to one embodiment of the present invention.

FIG. 4 is a plan view illustrating one example of a touch panel according to an aspect of the present invention, and the touch panel has an attached structure in which transparent electrode patterns of the X direction side and the Y direction side are formed over the respective side of two substrates, for example, and these two base materials are attached. ITO film can be used as transparent electrode pattern for example, and an extraction pattern made of transparent silver pattern is printed on each electrode. Glass or film can be used as base material, for example.

FIG. 4 illustrates an outer outline 11, an outline 12 of ITO, and an outline 13 of metal (for example, silver) area. Wiring areas 2a and 2b are formed along the outer periphery of the sensor part 1. The wiring area 2a is connected to a connector part 3a and the wiring area 2b is connected to a connector part 3b. The connector parts 3a and 3b are patterns for connection with exposed wiring patterns.

Figure 5:
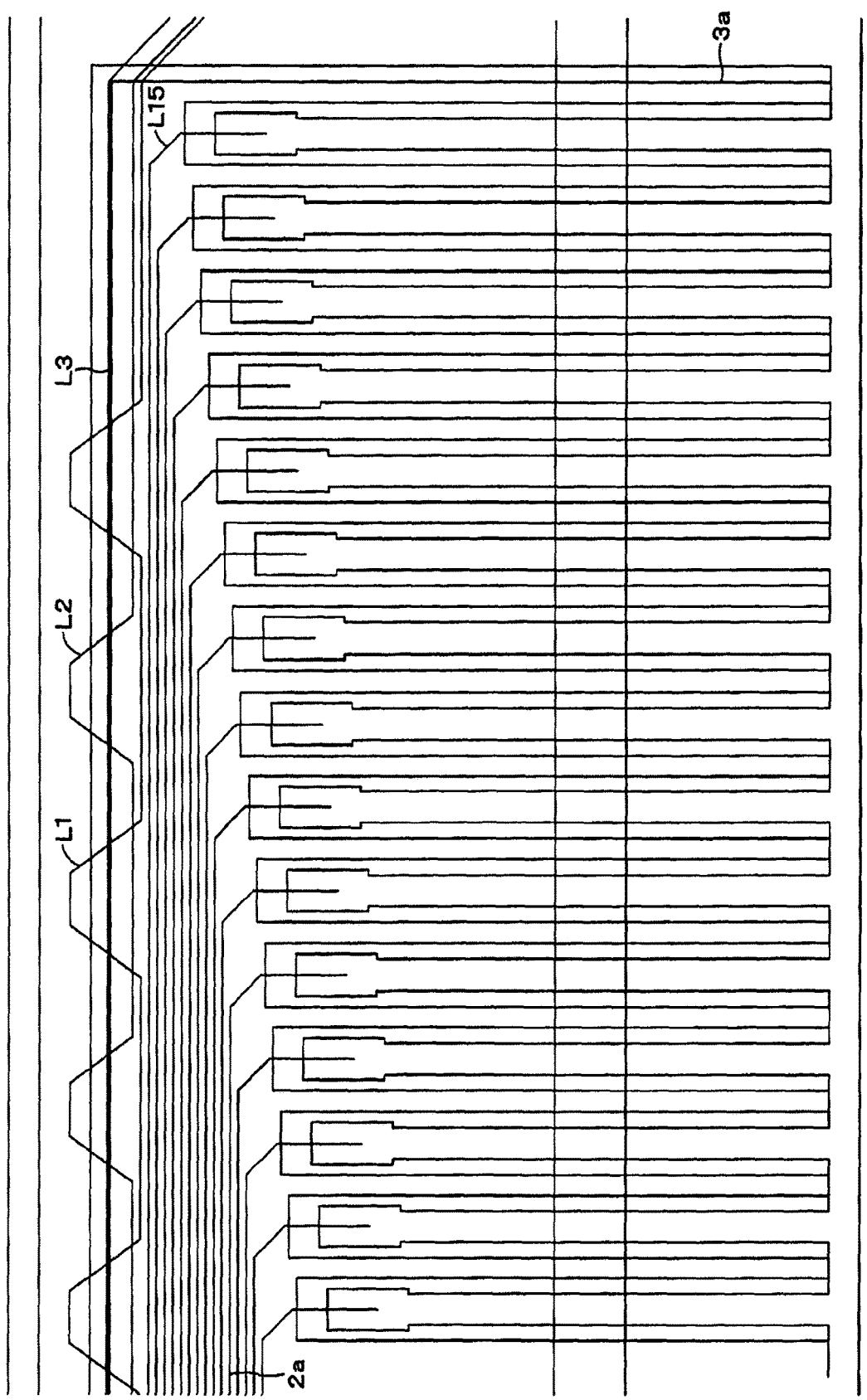
FIG. 5 is a partial enlargement plan view enlarging FIG. 4.

In FIG. 5, the wiring area 2a and the connector part 3a are enlarged. The wiring of the end of the wiring area 2a is formed by forming the trimming lines L1, L2, and L3 described above. In addition, also in the wiring area 2b and the connector part 3b, three trimming lines are formed and the wiring of the end of the wiring area 2b is formed.

REFERENCE SIGNS LIST

1. Sensor part
2, 2a, 2b Wiring area
3 Connector part
4 Tolerance margin
5, 5a, 5b Conductive area
L0, L1, L2, L3 Trimming line

The invention claimed is:

1. A touch panel comprising:
a sensor part; and
a wiring area including a wiring for connecting the sensor part and a connector part, wherein
a first and a second trimming lines are provided over a conductive area located inside and/or outside of several wirings in the wiring area,
a first section including a wiring with a first width and a second section including a wiring with a second width crossing the conductive area in the width direction and wider than the first width are formed by the first trimming line, and
the second trimming line crosses the first trimming line in the second section so that the width of the wiring in the second section is narrower than the second width.

2. The touch panel according to claim 1, further comprising a third trimming line provided almost parallel to the second trimming line in the conductive area.

3. The touch panel according to claim 1, wherein the second trimming line has a section crossing the conductive area in the width direction in the first section of the first trimming line.

4. The touch panel according to claim 1, wherein the first and the second trimming lines are laser trimming lines.

5. A method for forming a wiring of a touch panel comprising forming a sensor part and a wiring area including a wiring for connecting the sensor part and a connector part, wherein
a wiring is formed by a first and a second trimming lines provided over a conductive area located inside and/or outside of several wirings in the wiring area,
a first section including a wiring with a first width and a second section including a wiring with a second width crossing the conductive area in the width direction and wider than the first width are formed by the first trimming line, and
the width of the wiring in the second section becomes narrower than the second width by the second trimming line crossing the first trimming line in the second section.

6. The method for forming a wiring of a touch panel according to claim 5, wherein an area of the conductive area is equalized in the conductive area by a third trimming line provided almost parallel to the second trimming line.

7. The method for forming a wiring of a touch panel according to claim 5, wherein the second trimming line has a section crossing the conductive area in the width direction in the first section of the first trimming line.

* * * * *